United States Patent
Barrett et al.

(10) Patent No.: US 9,230,315 B2
(45) Date of Patent: Jan. 5, 2016

(54) COMPLEXITY ESTIMATION OF A 2D/3D CONVERSION

(75) Inventors: Timothy Alan Barrett, Pymble (AU); Pierre Hughes Routhier, Los Angeles, CA (US); Joan Llach, Cesson-Sevigne (FR); Ben Crosby, Murphy, TX (US)

(73) Assignee: Thomson Licensing, Issy les moulineaux (FR)

( * ) Notice: Subject to any disclaimer, the term of this patent is extended or adjusted under 35 U.S.C. 154(b) by 279 days.

(21) Appl. No.: 13/991,567

(22) PCT Filed: Dec. 8, 2010

(86) PCT No.: PCT/US2010/003108
§ 371 (c)(1),
(2), (4) Date: Jun. 4, 2013

(87) PCT Pub. No.: WO2012/078124
PCT Pub. Date: Jun. 14, 2012

(65) Prior Publication Data
US 2013/0259318 A1    Oct. 3, 2013

(51) Int. Cl.
*G06T 7/00* (2006.01)
*G06T 15/00* (2011.01)
(Continued)

(52) U.S. Cl.
CPC ... *G06T 7/00* (2013.01); *G06K 9/46* (2013.01); *G06T 7/0022* (2013.01); *G06T 7/0065* (2013.01); *G06T 15/00* (2013.01); *G06T 15/20* (2013.01); *H04N 13/026* (2013.01);
(Continued)

(58) Field of Classification Search
CPC ... G06T 2200/08; G06T 2200/16; G06T 7/00; G06T 7/0022; G06T 7/0034; G06T 7/0065; G06T 7/0067; G06T 7/0071; G06T 15/00; G06T 15/20; H04N 13/026; H04N 13/04; G06K 9/46

See application file for complete search history.

(56) References Cited

U.S. PATENT DOCUMENTS 5,777,666 A * 7/1998 Tanase ............... H04N 13/0055
348/43
6,496,598 B1 * 12/2002 Harman ............. H04N 13/0022
348/E13.004

(Continued)

FOREIGN PATENT DOCUMENTS

WO   WO 2006053271 A1 * 5/2006 ............. G06T 13/80
WO   WO2008075276           6/2008
(Continued)

OTHER PUBLICATIONS

Cotsaces et al., A Survey of Recent Work in Video Shot Boundary Deetection, Department of Informatices, Greece, pp. 1-4.
(Continued)

*Primary Examiner* — Manav Seth
(74) *Attorney, Agent, or Firm* — Robert D. Shedd; Robert B. Levy

(57) ABSTRACT

Automatic determination of the complexity associated with converting image content from 2-dimensions to 3-dimensions commences by first determining how many different scenes exist within the image content. Each scene then undergoes analysis to determine its complexity based on the motion, texture and occlusion within the scene. The scene complexities are added to the scene transition complexity and the total gets weighted to yield an overall indication of the complexity of converting of image content from 2-dimensions to 3-dimensions.

15 Claims, 4 Drawing Sheets

(51) Int. Cl.
*G06T 15/20* (2011.01)
*H04N 13/04* (2006.01)
*G06K 9/46* (2006.01)
*H04N 13/02* (2006.01)

(52) U.S. Cl.
CPC ........... *H04N 13/04* (2013.01); *G06T 2200/08* (2013.01); *G06T 2200/16* (2013.01)

(56) References Cited

U.S. PATENT DOCUMENTS

| | | | |
|---|---|---|---|
| 2004/0125983 | A1 | 7/2004 | Reed et al. |
| 2006/0132482 | A1* | 6/2006 | Oh .......................... G06T 13/80 345/419 |
| 2006/0262849 | A1 | 11/2006 | Tsai et al. |
| 2009/0116732 | A1* | 5/2009 | Zhou et al. .................. 382/154 |
| 2010/0111180 | A1 | 5/2010 | Gao et al. |

FOREIGN PATENT DOCUMENTS

| | | |
|---|---|---|
| WO | WO2009057898 | 5/2009 |
| WO | WO2009096912 | 8/2009 |
| WO | WO2010036772 | 4/2010 |

OTHER PUBLICATIONS

Shao et al., "Automatic 2D to 3D Footage Conversion for 3D Glasses-free Display Systems", Dynamic Digital Depth Research, pp. 1-3.

Pfeiffer, "Intellihance, Client Side and Server Side Architectures for Photo Site Image Enhancement", Proceedings of SPIE, vol. 4311, 2001, pp. 44-52.

Kim et al., "A Novel Color Mapping Method for Preferred Color Reproduction", Proc. of SPIE-IS&T Electronic Imaging, SPIE, vol. 6493, 2007, pp. 1-7.

Search Report Dated Aug. 9, 2011.

* cited by examiner

COMPLEXITY ESTIMATION OF A 2D/3D CONVERSION

This application claims the benefit, under 35 U.S.C. §365 of International Application PCT/US2010/003108, filed Dec. 8, 2010, which was published in accordance with PCT Article 21(2) on Jun. 14, 2012 in English.

TECHNICAL FIELD

This invention relates to a technique for facilitating the conversion of two-dimensional images into three-dimensional images.

BACKGROUND ART

Consumer demand for 3-dimensional image content has grown dramatically. Content owners have sought to meet the increased demand by converting existing 2-dimensional content into 3-dimensional content. To convert a movie from 2-dimensions into 3-dimensional requires significant preliminary analysis in order to determine the complexity of such conversion (e.g., the number of scenes, distribution of scene length, occlusions and scene complexity). Knowing these details, henceforth to be known as conversion complexity, enables more accurate cost estimates and allows a better assessment of the likely outcome of the 2D to 3D conversion.

Currently, estimation of the overall 2D to 3D conversion complexity and hence, cost estimation is determined manually on a scene-by-scene basis. Manual complexity determination incurs high expense in term of the resources necessary to make such a determination. No known automated mechanisms exist for determining the overall complexity of the 2D to 3D conversion and therefore, the likely cost.

Thus, a need exists for an automated technique for determining the complexity of converting a 2-dimensional image into a 3-dimensional image.

BRIEF SUMMARY OF THE INVENTION

Briefly, in accordance with a preferred embodiment, a method for determining the cost, complexity and likely success of a 2D to 3D conversion commences by first determining how many different scenes exist within the image content. Each scene then undergoes analysis to determine its complexity. The scene complexities are added to the boundary complexity and the total gets weighted to yield an overall indication of the complexity of converting the content from 2-dimensions to 3-dimensions. The complexity indication serves to help determine both the cost and likely success of the 2D to 3D conversion.

DETAILED DESCRIPTION

Figure 1:
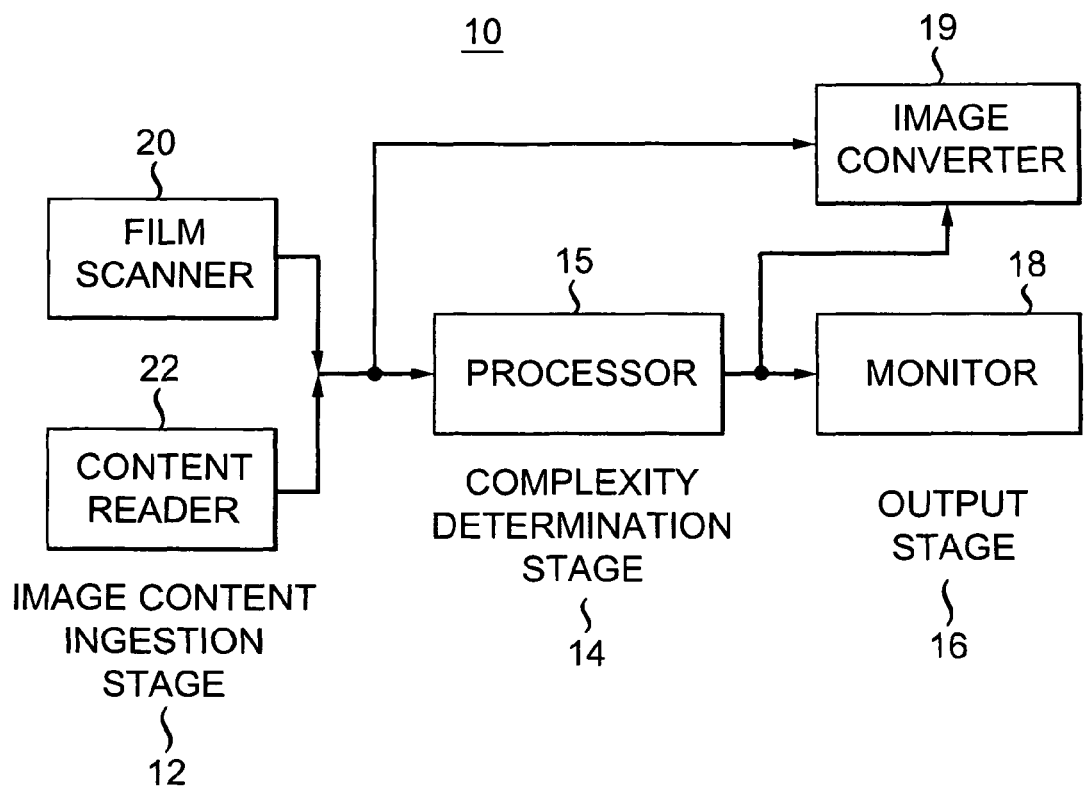
FIG. 1 depicts a block schematic view of a system, in accordance with a preferred embodiment with the present principles, for determining the complexity of converting image content from 2-dimensions into 3-dimensions to facilitate making a decision whether to undertake such conversion.

FIG. 1 depicts a block schematic diagram of a system 10 in accordance with a preferred embodiment of the present principles for determining the complexity of converting image content from 2-dimensions into 3-dimensions to facilitate making a decision whether to undertake such conversion. Such image content typically takes the form of film or video containing a succession of scenes. The system 10 comprises an image content ingestion stage 12, which receives 2-dimensional image content in the form of film or video as described. The image content received by the content ingestion stage 12 undergoes processing at a complexity determination stage 14 which automatically determines the complexity of converting image content from 2-dimensions into 3-dimensions. The complexity determination stage 14 typically comprises an image-pre processor 15 in the form of one or more computers, that automatically performs the complexity determination in the manner described hereinafter. Although not shown, the image pre-processor 15 has associated with it one or more user input devices such as a mouse and keyboard.

The complexity determination made automatically by the complexity determination stage 14 is received by an output stage 16, which typically takes the form of a display device such as a monitor 18 or the like.

In practice, the process of converting 2D to 3D images generally requires significant resources and much manual effort. Thus, knowing in advance the cost and complexity will often determine whether to undertake the process at all. Assuming that the complexity and hence the cost do not mitigate against 2D to 3D image conversion, having additional guidance as to how such scenes might ultimately appear, and indeed, whether such scenes can indeed be converted automatically will prove useful when undertaking the actual conversion process. To that end, the system 10 of FIG. 1 preferably can include an image converter 19 capable of automatically performing a simple 2D to 3D conversion of the image content. The converted 3D image produced by the image converter typically will not possess the necessary quality for audience viewing. Indeed, the actual process for converting 2D to 3D images associated with a feature length motion picture often takes months of manual effort using sophisticated algorithms executed on powerful computers. Rather, the 2D to 3D image conversion performed by the image converter 19 serves as a guide to identify which scenes will render better than others, as well as which scenes may not render well at all. Techniques exist within the art for converting 2-dimensional images to 3-dimensional images. To perform such image conversion, the image converter 19 typically will undertake the following steps with respect to the image content: (1) reconstructing the camera path, (2) matching images to obtain correspondence, and (3) propagating image depth by generating a dense disparity map.

As will be discussed hereinafter, the complexity determination made by the complexity determination stage 14 of FIG. 1 represents a weighted combination of the complexities of the individual scenes within the image content. In addition to providing the image converter 19 with an overall complexity determination, the processor 15 can also provide the individual scene complexities as well.

Referring to FIG. 1, the structure of the image content ingestion stage 12 will depend on the nature of the image content. For image content in the form of motion picture film, the content ingestion stage 12 would include a film scanner 20 capable of converting the film images into digital signals. For image content already in electronic form such as content recorded on a magnetic, optical or solid-state media, the content ingestion stage 12 would include a content reader 22 capable of reading the media storing the image content.

Figure 2:
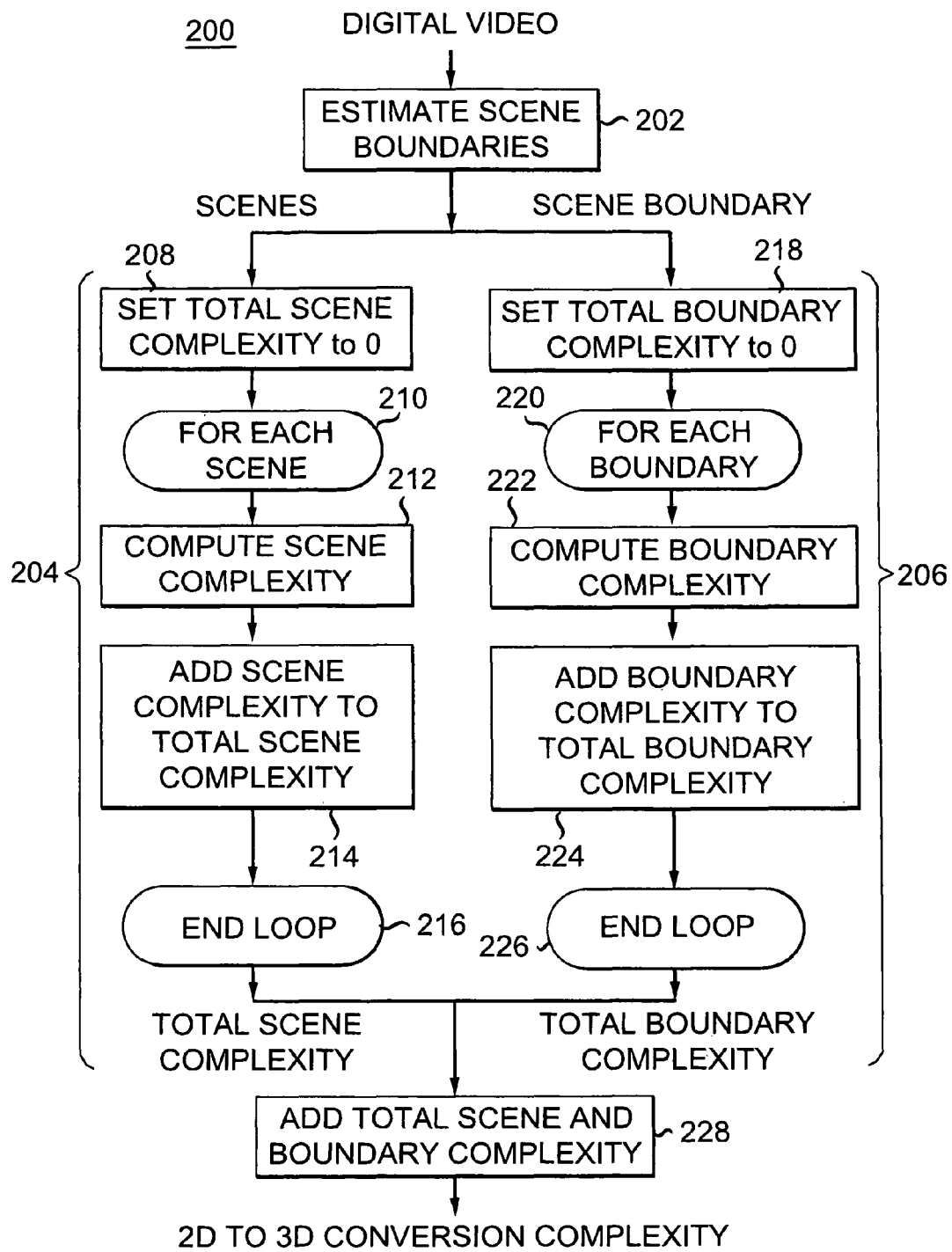
FIG. 2 depicts, in flow chart form, a first method in accordance with a preferred embodiment of the present principles practiced by the system of FIG. 1 for determining the complexity of converting image content from 2-dimensions into 3-dimensions.

FIG. 2 depicts, in flow-chart form, the steps of a first process 200 in accordance with a preferred embodiment of the present principles for determining the complexity of converting the image content from 2-dimensions to 3-dimensions. The complexity obtained by the method 200 of FIG. 2 enables generation of information that provides an estimate of the expected time and cost of the conversion process.

The method 200 of FIG. 2 commences with step 202 during which the image pre-processor 15 of the complexity determination stage 14 of FIG. 1 estimates the scene boundaries in order to isolate each of the scenes. For uncompressed image content, boundary scene estimation can occur in several ways. One approach would be to analyze each frame in relation to a subsequent frame. In practice, the presence of a large difference ($\Delta$) within the image content from one frame to the next usually constitutes a scene change indicative of a scene boundary. (This technique finds application in encoders to enable a determination of where to insert reference frames.) The difference between frames not only enables determination of the start and end points for each scene, but also allows a determination of the total number of scenes. The number and duration of the scenes within the image content has significant relevance to the 2-dimensional to 3-dimensional conversion process as the process requires careful management of each scene boundary which represents a significant portion of the overall cost.

The complexity of each scene constitutes another key factor in determining the likely success of 2-dimensional to 3-dimensional conversion of image content. Highly complex scenes often do not translate well into a 3-dimensional image having a pleasing visual appearance. Significant re-work in the conversion process often becomes necessary to make such scenes appear acceptable. As with scene detection, the determination of complexity constitutes a known process employed by variable bit rate encoders, where the more motion and complexity in a scene results in a higher the amount of bits applied by the encoder to that portion of the image content.

As described in greater detail hereinafter, each scene and each boundary typically undergo analysis independently to determine complexity and to associate a corresponding rating. The process defines each scene's duration and an associated complexity rating. Multiplying the scene's duration and complexity with appropriate weighting factors and then summing the results yields an overall value for estimating the cost and difficulty of performing the 2-dimensional to 3-dimensional conversion. The cost and difficulty will reflect the likely quality of the outcome of the conversion process and viewing experience of users (based on how much of the image content exceeds a predetermined complexity threshold.)

If the image content exists in compressed form, the content typically will undergo decompression by a decoder (not shown) prior to receipt by the image pre-processor 15 of FIG. 1. Alternatively, the processor 15 of the complexity determination stage 14 can make use of compressed image content by leveraging some of the work already performed during the compression process. For example, typical compression techniques often tag scenes independently, or provide tags for reference frames, which can occur at irregular intervals, thus representing scenes in the image content. While tags can occur at regular intervals that represent scenes, such tags can also exist within the image content when in an uncompressed state. Thus, such tags can undergo a comparison with previous scenes to determine the difference ($\Delta$) to see if the tag represents a scene boundary.

Following determination of the scene boundaries, an examination of the bit rate (the amount of bits per time period) for a given scene can yield a measure of the complexity of compressed, variable bit rate image content. Broadly, the higher the bitrate, the higher the complexity of the information. Thus, image content recorded on a DVD or Blu-ray disk using variable bit rate encoding can constitute a good source of image content for approximating the cost, complexity and likely success of a 2-dimensional to 3-dimensional conversion of such image content.

A significant component of the cost of performing a 2D to 3D conversion of image content, in the form of movie or the like, can be defined as a function of the number of scenes (the more scenes, the higher the cost), the complexity of each scene, and the amount of change between scenes, i.e. the complexity of the boundary/transition between consecutive scenes. For instance, the complexity of image content like a movie can be computed as follows:

$$C = \sum_{i=1}^{N} L_{S(i)} C_{S(i)} + \sum_{i=1}^{N-1} C_{B(i)} \quad \text{(Equation 1)}$$

where N is the number of scenes in the movie, $L_{S(i)}$ is the length of scene S(i), $C_{S(i)}$ is the complexity of scene S(i), and $C_{B(i)}$ is the complexity of scene boundary B(i), i.e., the boundary between scenes S(i) and S(i+1). Note that the boundary complexity can be set to 0 and its complexity split between the two surrounding scenes. In such case, the previous equation becomes:

$$C = \sum_{i=1}^{N} L_{S(i)} C_{S(i)} \quad \text{(Equation 2)}$$

The complexity of a scene can be defined as a function of motion and texture of the objects in the scene. Many moving, textured objects are more difficult to convert from 2-dimensional to 3-dimensional than a few static, simple objects. For instance, the complexity of a scene can be computed as follows:

$$C_S = \sum_{j=1}^{M} L_{O(j)} \cdot (w \cdot C_{O(j)}^m + (1-w) \cdot C_{O(j)}^t) \quad \text{(Equation 3)}$$

where M represents the number of objects to be converted, $L_{O(j)}$ represents the duration within the scene of object O(j), w represents is a weighting factor in the range [0,1], $C^m_{O(j)}$ represents the complexity of the motion for object O(j), and $C^t_{O(j)}$ represents the complexity the of texture of object O(j).

A particular case can be defined assuming there is a single object, taking the entire scene (i.e. all pixels from all images belonging to the scene). In such case, scene complexity is computed as follows:

$$C_S = L_S \cdot (w \cdot C_S^m + (1-w) \cdot C_S^t) \quad \text{(Equation 4)}$$

where motion complexity can be computed as follows:

$$C_S^m = \frac{1}{L_S} \sum_{t=1}^{L_S} \frac{1}{M \cdot N} \sum_{x,y}^{M,N} \|\vec{m}_t(x, y)\| \quad \text{(Equation 5)}$$

and texture complexity can be computed as follows:

$$C_S^t = \frac{1}{L_S} \sum_{t=1}^{L_S} \frac{1}{M \cdot N} \sum_{x,y}^{M,N} Grad(I_t(x, y)) \quad \text{(Equation 6)}$$

where M×N is the dimension of the image (in pixels), $I_t(x,y)$ denotes pixel (x,y) at time t, $\vec{m}_t(x,y)$ denotes the motion vector for pixel (x,y) at time t, Grad(.) denotes the gradient operator, and ‖.‖ denotes the norm-2 operator.

The complexity of a transition between consecutive scenes varies in proportion to the amount of change between such scenes. The amount of change can be computed based on the difference between the last frame of one scene and the first frame of the following scene:

$$C_{T(i)} = \sum_{x,y}^{M,N} \|I_t(x, y) - I_{t+1}(x, y)\| \quad \text{(Equation 7)}$$

where the scene boundary is located between time t and t+1.

Still referring to FIG. 2, after estimating the scene boundaries during step 202, two separate program loops 204 and 206 undergo execution, typically at the same time, to determine the scene and boundary complexity, respectively. The scene complexity loop 204 begins with initialization of the scene complexity score to zero during step 208. Next, identification of a given scene occurs during step 210. The identification step 210 typically includes advancing the index variable (i) for each successive scene, with the initial value of the index variable being unity so as to indentify the first scene.

Following step 210, computation of the scene complexity occurs during step 212. The computation of scene complexity occurs in accordance with Equation (1). Thereafter, the scene complexity value computed during step 212 gets added during step 214 to the complexity of the previous scene to obtain a total scene complexity value. During step 216, execution of the loop 204 repeats until computation of the complexity of all of the scenes is computed, whereupon execution of the loop 204 ends.

The boundary complexity loop 206 begins with initialization of the boundary complexity score to zero during step 218. Next, identification of a given boundary occurs during step 220. The identification step 210 typically includes advancing the index variable (i) for each successive boundary, with the initial value of the index variable being unity to identify the first scene boundary.

Following step 220, computation of the boundary complexity occurs during step 222. Thereafter, the boundary complexity value computed during step 222 gets added during step 224 to the complexity of the previous boundary to obtain a total boundary complexity value. During step 226, execution of the loop 206 repeat until computation of the complexity of all of the boundaries is computed, whereupon execution of the loop 206 ends. After execution of the loops 204 and 206, the total scene and boundary complexities get scaled and added together during step 228 to yield a complexity value. As discussed previously, the complexity value provides an indication of the overall complexity and cost of converting 2-dimensional content into 3-dimensions.

Figure 3:
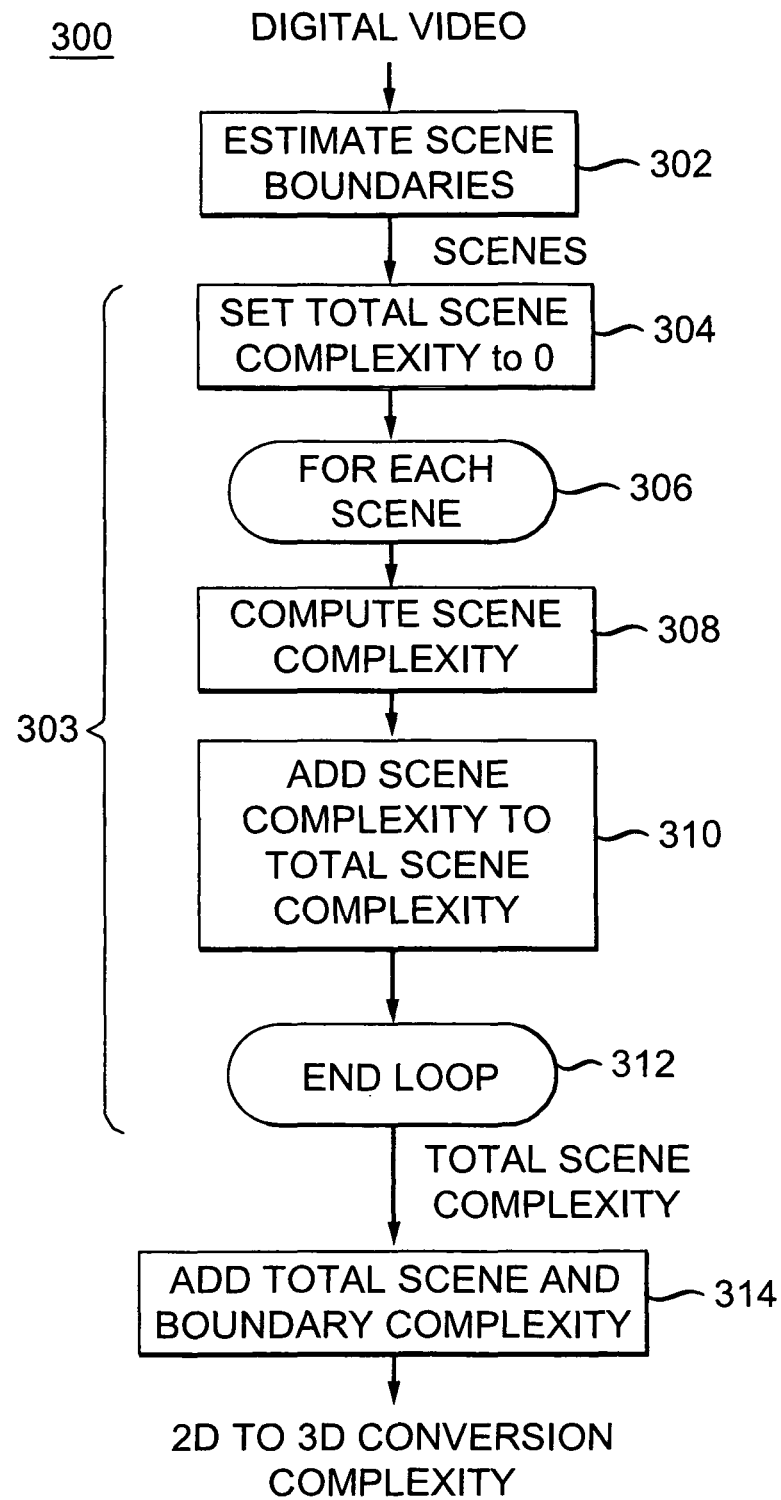
FIG. 3 depicts, in flow chart form, a second method, in accordance with a preferred embodiment of the present principles practiced by the system of FIG. 1 for determining the complexity of converting image content from 2-dimensions into 3-dimensions.

FIG. 3 depicts, in flow chart form, the steps of an alternate method 300. The method 300 of FIG. 3 commences upon execution of step 302 during scene boundaries are estimated. Any of several well known scene change detection methods can serve to automatically estimate scene boundaries. See for instance the following publication and the references cited therein. Cotsaces, C., Gavrielides, M. and Pitas, I. (2005), "A survey of recent work in video shot boundary detection", Proceedings of 2005 Workshop on Audio-Visual Content and Information Visualization in Digital Libraries, available at http://poseidon.csd.auth.gdpapers/PUBLISHED/CONFERENCE/pdf/Cotsaces05a.pdf. Thereafter, a scene complexity determination loop 303 undergoes execution, beginning with initialization of the scene complexity score to zero during step 304. Next, identification of a given scene occurs during step 306. The identification step 306 typically includes advancing the index variable (i) for each successive scene, with the initial value of the index variable being unity to identify the first scene.

Following step 306, computation of the scene complexity occurs during step 308. The computation of scene complexity occurs in accordance with Equation (2). Thereafter, the scene complexity value computed during step 308 gets added to the complexity of the previous scene during step 310 to obtain a total scene complexity value. During step 312, execution of the loop 303 repeat until computation of the complexity of all of scenes has occurred, whereupon execution of the loop 303 ends. After execution of the loops 303, the total scene and boundary complexities get scaled and added together during step 314 to yield a complexity value. As discussed previously, the complexity value provides an indication of the overall complexity and cost of converting 2-dimensional content into 3-dimensions.

Object Occlusion

Figure 4:
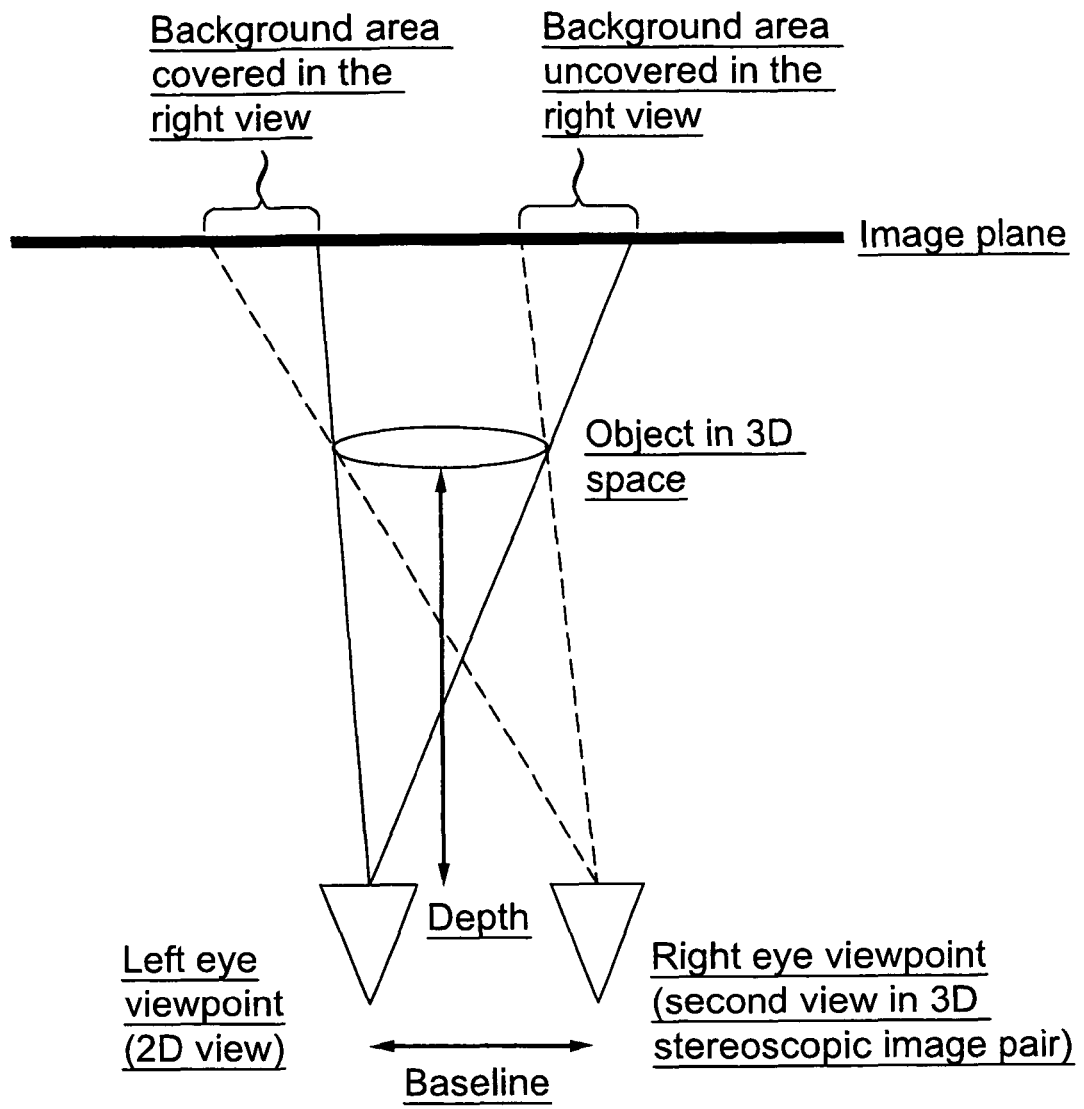
FIG. 4 depicts an example of background occlusion/unocclusion.

Another important aspect to estimate the complexity of the 2D to 3D conversion process it the amount of occluded areas that will be uncovered in the estimated view of the 3D stereoscopic pair, as the process of filling in these uncovered areas with the appropriate information (typically known as inpainting) is time consuming and expensive. As illustrated in FIG. 4, the position (in the image plane) of objects will change between the left view (corresponding to the input 2D video in the provided example) and the right view (estimated right view of the 3D stereoscopic video). The dotted lines in FIG. 4 represent the projection to the left image plane; dashed lines represent the projection to the right image plane. A portion of the background which was covered on the left image becomes visible on the right image. Similarly, a portion of the background which was uncovered on the left image becomes invisible on the right image. This change in relative position is due to the difference in viewpoint between left and right images and the depth of the objects, resulting in areas which were not visible in the original view becoming visible in the estimated view, and vice versa; e.g. background area in FIG. 4. The additional complexity caused by object occlusions can be taken into account by factoring in baseline length and object depth to the overall conversion cost.

Complexity Change Due to Baseline Length

In a particular embodiment, the overall conversion complexity could be increased/decreased based on the ratio between the actual baseline length and reference baseline length:

$$\Delta C_{SL} = \frac{B_a}{B_r} \quad \text{(Equation 8)}$$

where $B_r$ is the reference baseline length (corresponding to typical view separation), and $B_a$ is the actual baseline length used in the conversion. When $B_a > B_r$, the conversion cost increases, since larger baselines imply larger uncovered areas. Conversely, when $B_a < B_r$ the conversion cost decreases due to the smaller uncovered areas.

The $\Delta C_{BL}$ conversion cost can be factored into the scene conversion cost (e.g. equation 8) by simple multiplication:

$$C_S|_{SL} = \Delta C_{SL} \cdot C_S \quad \text{(Equation 9)}$$

Complexity Change Due to Object Depth

Similarly, object complexity can be scaled up or down based on the depth of the object. In particular, the more an object "moves" between the original view and the estimated view, the larger the uncovered area could be and therefore the higher the cost (as more pixels have to be inpainted). The amount of displacement depends on the depth of the object and the focal distance, and it's known as disparity. Given the disparity $d_O$ and height $h_O$ of object O (all units in pixels) the amount of uncovered area can be factored into the object conversion cost (i.e. summation term of Equation 10) as follows:

$$C_S = \sum_{j=1}^{M} \left(1 + w_d \frac{|d_{O(j)}| \cdot h_{O(j)}}{|d_{max}| \cdot h_{max}}\right) \cdot L_{O(j)} \cdot (w \cdot C_{O(j)}^m + (1-w) \cdot C_{O(j)}^t) \quad \text{(Equation 11)}$$

where |.| denotes absolute value, $d_{max}$ denotes the typical maximum disparity and $h_{max}$ denotes the maximum object height (typically equal to image height). $w_d$ is a weighting factor larger than 0 which controls how sensitive the overall object conversion cost is to object occlusion; the larger $w_d$, the higher the conversion cost increase. In a typical application, $w_d$ equals 10, which doubles the conversion cost of objects with medium disparity ($d_O$=20) and fairly large height ($h_O$=40% image height), assuming $d_{max}$=80. Note that $d_{max}$ is just a reference disparity value, it's possible that $d_O$ be larger than $d_{max}$.

A more complex criterion that takes into account the depth of multiple objects simultaneously could also be used to estimate conversion costs. An object with large disparity should entail a large uncovered area. However, if such object is surrounded by other objects with similarly large disparities, the actual uncovered area will be much smaller than anticipated. (Just for the purpose of conversion cost estimation, object interactions do not seem necessary to be taken into account).

OBJECT DETECTION & CHARACTERIZATION

In order to estimate the conversion cost, some information about the objects present in the scene becomes necessary, namely their shape and location (from where height and be derived) and the corresponding depth/disparity.

Approximate information is enough for conversion cost estimation. So, in a fully manual approach an operator could simply sketch the contour of the objects, for one or more key frames of each scene, and assign to each a relative disparity (low, med, high; in front or behind the screen plane).

It is also possible to automate the object detection and characterization steps. Key frames can be automatically extracted by following fixes rules (e.g. first, last, and central frame of each scene, 1 key frame every 10 seconds of video, etc.) or by applying some of the existing algorithms. Object boundaries can be automatically detected using foreground/background separation techniques. Both steps can also be combined in a joint approach. Once objects have been defined, their depth can also be automatically estimated. However, in most cases manual depth estimation is more accurate and faster.

2D TO 3D COMPLEXITY ESTIMATION ALGORITHM

FIG. 2 and FIG. 3 show the basic steps to estimate the complexity of the 2D to 3D conversion process, the former using Eq. 1, the latter Eq. 2. The equations provided in the previous sections serve as example on how to compute the complexity of each scene. Any of the automatic scene change detection methods present in the state of the art can be used to automatically compute scene boundaries.

An additional part of the process may also include prioritization of particular objects for special attention during the conversion process. This could, for example, be particular characters, such as Woody and Buzz in Toy Story that would need to be either detected, using object or face recognition technology, or in a semi-automated fashion as the content is being processed.

The foregoing describes a technique for determining the complexity of converting image content from 2-dimensions to 3-dimensions.

The invention claimed is:

1. In an image pre-processor, a method for processing 2-dimensional image content having a plurality of scenes, comprising the steps of:
   determining how many scenes exist within the image content;
   determining complexity of each scene;
   adding the scene complexities to a boundary complexity value to yield an overall complexity value indicative of the complexity of converting of image content from 2-dimensions to 3-dimensions; and
   calculating a cost of conversion and likely success rate of the image content from 2-dimensions to 3-dimensions.

2. The method according to claim 1 wherein the step of determining how many scenes exist within the image content includes the steps of:
   determining scene boundaries; and
   determining scene durations.

3. The method according to claim 2 wherein the step of determining scene boundaries includes the steps of determining whether the difference between successive scenes exceeds a threshold value.

4. The method according to claim 1 wherein the boundary complexity value comprises a sum of the complexities of individual scene boundaries.

5. The method according to claim 4 wherein individual scene complexity is determined by determining motion and texture within the scene.

6. The method according to claim 5 wherein individual scene complexity further includes determining object occlusion within the scene.

7. The method according to claim 1 further comprising the step of automatically performing a limited 2D to 3D conversion of the image to generate a guide for subsequent manual 2D to 3D image conversion.

8. The method according to claim 4 wherein the boundary complexities are established contemporaneously with the scene complexities.

9. Apparatus for processing 2-dimensional image content having a plurality of scenes, comprising:
   means for determining how many scenes exist within the image content;
   means for determining complexity of each scene; and
   means for adding the scene complexities to a boundary complexity value to yield an overall complexity value indicative of the cost and likelihood of success of converting of image content from 2-dimensions to 3-dimensions.

10. The apparatus according to claim 9 further including means for performing a limited 2D to 3D conversion of the image content to yield a guide for such conversion.

11. Apparatus for processing 2-dimensional image content having a plurality of scenes, comprising:
   a content ingestion stage comprising a content reader configured to receive image content; and
   a complexity determination stage comprising a processor configured to automatically determine an overall complexity value associated with of converting of image content from 2-dimensions to 3-dimensions by adding a scene complexity of each scene to a boundary complexity value for each respective scene; and
   an output stage comprising a display device configured to display the determined complexity value.

12. The apparatus according to claim 11 wherein the content ingestion stage includes a film scanner for scanning a motion picture film to yield signals representative thereof.

13. The apparatus according to claim 11 wherein the content reader is configured to read image content stored on one of magnetic, optical or solid-state media.

14. The apparatus according to claim 11 wherein the display device is configured to provide a visual display of the complexity of the image content.

15. The apparatus according to claim 11 wherein the output stage further includes means for performing a limited 2D to 3D conversion of the image content to yield a guide for manual 2D to 3D conversion.

* * * * *